United States Patent
Hou et al.

(10) Patent No.: US 9,898,661 B2
(45) Date of Patent: Feb. 20, 2018

(54) ELECTRONIC APPARATUS AND METHOD FOR STORING DATA

(71) Applicants: Beijing Lenovo Software Ltd., Haidian District, Beijing (CN); Lenovo (Beijing) Co., Ltd., Haidian District, Beijing (CN)

(72) Inventors: Xinru Hou, Beijing (CN); Shifeng Peng, Beijing (CN); Zhenyi Yang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 400 days.

(21) Appl. No.: 14/167,486

(22) Filed: Jan. 29, 2014

(65) Prior Publication Data

US 2014/0210694 A1 Jul. 31, 2014

(30) Foreign Application Priority Data

Jan. 31, 2013 (CN) .......................... 2013 1 0038948
Mar. 8, 2013 (CN) .......................... 2013 1 0074053

(51) Int. Cl.
*G09G 5/00* (2006.01)
*G06K 9/00* (2006.01)
(Continued)

(52) U.S. Cl.
CPC ..... *G06K 9/00664* (2013.01); *G01C 21/3602* (2013.01); *G01C 21/3632* (2013.01);
(Continued)

(58) Field of Classification Search
None
See application file for complete search history.

(56) References Cited

U.S. PATENT DOCUMENTS

2002/0173911 A1* 11/2002 Brunet ................ G06F 17/3061
702/1
2007/0025593 A1* 2/2007 Haupt ................ G06K 9/00771
382/103
(Continued)

FOREIGN PATENT DOCUMENTS

CN 101610341 12/2009

OTHER PUBLICATIONS

First Office dated Sep. 2, 2016 out of Chinese Patent Application No. 201310038948.1 (26 pages including English Translation).
(Continued)

*Primary Examiner* — Ilana Spar
*Assistant Examiner* — Kirk Hermann
(74) *Attorney, Agent, or Firm* — Brinks Gilson & Lione; G. Peter Nichols (57) ABSTRACT

An electronic apparatus and a method for storing data include an object storing unit for storing at least one target object set in advance; an image pick-up unit for picking up a first image; a recognizing unit for determining whether one or more of target objects appear in the first image and generating a first recognition result; an image storing unit for storing the first image in which the target object appears as object image of the target object for each target object; a receiving unit for receiving an input from a user; a first acquiring unit for determining the target object indicated by a search input, and acquiring object image corresponding to the target object indicated by the search input; and a display unit for displaying the acquired object image.

19 Claims, 6 Drawing Sheets

(51) Int. Cl.
*G02B 27/01* (2006.01)
*G01C 21/36* (2006.01)

(52) U.S. Cl.
CPC ....... *G01C 21/3688* (2013.01); *G02B 27/017* (2013.01); *G02B 27/0176* (2013.01); *G06K 9/00671* (2013.01); *G02B 2027/0138* (2013.01); *G02B 2027/0141* (2013.01); *G02B 2027/0178* (2013.01)

(56) References Cited

U.S. PATENT DOCUMENTS

| | | | | |
|---|---|---|---|---|
| 2009/0116815 | A1* | 5/2009 | Ryu | H04N 5/76 386/241 |
| 2009/0183177 | A1* | 7/2009 | Brown | G06Q 10/10 719/318 |
| 2009/0316962 | A1* | 12/2009 | Sun | G06K 9/00248 382/118 |
| 2009/0327272 | A1* | 12/2009 | Koivunen | G06F 17/30026 |
| 2011/0169932 | A1 | 7/2011 | Mula et al. | |
| 2012/0045093 | A1* | 2/2012 | Salminen | G06K 9/00295 382/103 |
| 2012/0213422 | A1* | 8/2012 | Niskanen | G06K 9/00228 382/118 |
| 2012/0294520 | A1* | 11/2012 | Mei | G06K 9/00335 382/164 |

OTHER PUBLICATIONS

Office Action, and English language translation thereof, in corresponding Chinese Application No. 201310038948.1, dated May 2, 2017, 30 pages.

\* cited by examiner

ELECTRONIC APPARATUS AND METHOD FOR STORING DATA

BACKGROUND

This application claims priority to Chinese patent application No. 201310038948.1 filed Jan. 31, 2013; and Chinese patent application No. 201310074053.3 filed Mar. 8, 2013, the entire contents of which are incorporated herein by reference.

The present embodiment of the invention relates to an electronic apparatus and a method for storing data applied in the electronic apparatus.

People usually encounter a situation in which the place where a certain object is put cannot be recalled so that the object cannot be found in daily life. For example, with the development of communication technology, portable electronic apparatus such as a portable computer, a tablet computer, a mobile phone and a multimedia player come into widespread use. These portable electronic apparatus can provide various functions to the user to facilitate use of the user. Therefore, the user usually carries one or more of these portable electronic apparatus. However, sometimes, the user may forget to place these portable electronic apparatus properly after taking out these portable electronic apparatus to use. This results in that the user cannot find the apparatus when he needs again which to use, so that bring inconvenience to the user.

SUMMARY

The purpose of the embodiments of the present invention is to provide an electronic apparatus and a method for storing data applied in the electronic apparatus to solve the above problem.

One embodiment of the present invention. provides an electronic apparatus including: an object storing unit configured to store at least one target object set in advance; an image pick-up unit configured to pick up a first image; a recognizing unit configured to determine whether there appears one or more of the target object in the first image and generate a first recognition result; an image storing unit configured to according to the first recognition result, store the first image in which the target object appears as object image of the target object for each target object, wherein a corresponding object image being identified according to a time of storing the first image and the target object; a receiving unit configured to receive an input of the user; a first acquiring unit configured to determine the target object indicated by a search input when the input of the user is the search input, and acquire the object image corresponding to the target object indicated by the search input in the storing unit; and a display unit configured to display the object image corresponding to the target object indicated by the search input.

Another embodiment of the present invention provides a method for storing data applied in the electronic apparatus. The method includes: storing at least one target object set in advance; picking up a first image; determining whether there appears one or more of the target object in the first image, and generating a first recognition result; according to the first recognition result, storing the first image in which the target object appears as object image of the target object for each target object, wherein a corresponding object image is identified according to time of storing the first image and the target object; receiving input of the user; determining the target object indicated by a search input when the input of the user is the search input, and acquiring the object image corresponding to the target object indicated by the search input in the stored object image; and displaying the object image corresponding to the target object indicated by the search input.

The electronic apparatus and the method for storing data according to the embodiment of the present invention can mitigate the pressure of the user's memory, and help the user manage object conveniently. In particular, in the electronic apparatus and the method for storing data according to the embodiment of the present invention, by recognizing whether the target object appears in the picked-up first image and storing the first image in which the target object appears as the object image of the target object when the target object appears in the first image, the user can view the stored object image of the target object when he cannot find the target object, so as to find the target object according to the object image.

BRIEF DESCRIPTION OF THE DRAWINGS

In order to describe the technical solution of the embodiment of the invention more clearly, the accompanying drawings necessary for using in the description of the embodiments are explained simply hereinafter.

DETAILED DESCRIPTION

Hereinafter, the preferred embodiments of the invention are described detailed with reference to the accompanying drawings. It is noticed that in the specification and accompanying drawings, substantially same steps and elements are represented by same reference numbers, and the repetitive explanation on these steps and elements would be omitted.

Figure 1:
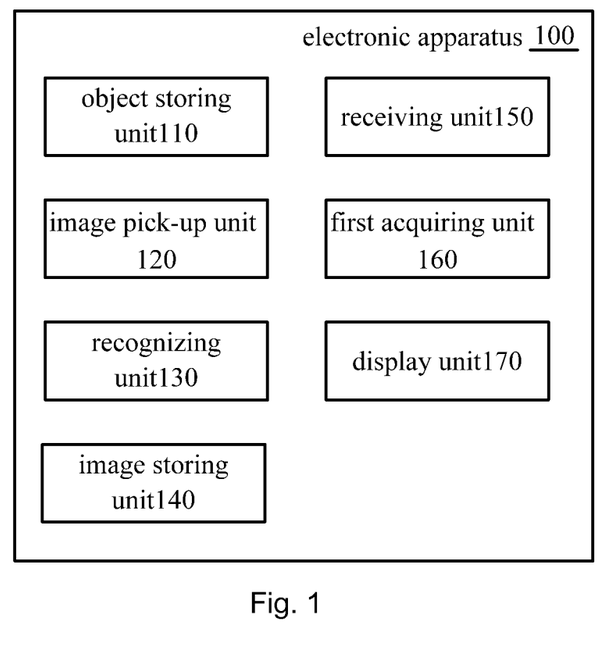
FIG. 1 illustrates a schematic block diagram of the electronic apparatus according to one embodiment of the present invention.

In the following embodiments of the present invention, the concrete forms of the electronic apparatus include, but not limited to a mobile telephone, a personal digital assistant, a multimedia player or the like. Further, according to embodiment of the present invention, the electronic apparatus may be wearable electronic apparatus. Hereinafter, the electronic apparatus according to one embodiment of the present invention will be explained with reference to FIG. 1. FIG. 1 illustrates a schematic block diagram of the electronic apparatus 100 according to one embodiment of the present invention. As shown in FIG. 1, the electronic apparatus 100 includes an object storing unit 110, an image pick-up unit 120, a recognizing unit 130, an image storing unit 140, a receiving unit 150, a first acquiring unit 160 and a display unit 170.

In particular, the object storing unit 110 can store at least one target objects set in advance. According to one example of the present invention, the target object may be common portable article of a user, for example, a purse, a key, a mobile phone, a multimedia player, a portable notebook computer, a tablet computer or the like.

The image pick-up unit 120 can pick up a first image. For example, the image pick-up unit 120 may be a camera. And the image pick-up unit 120 can automatically shoot the environment around the electronic apparatus to obtain the first image.

The recognizing unit 130 can determine whether one or more of the pre-stored target object appears in the first image and generate a first recognition result. For example, in case that the pre-stored target object includes the purse, the key, the mobile phone and the recognizing unit 130 determines that the key appears in the first image, the first recognition result is generated to indicate that the key appears in the current first image.

Then, according to time of storing the first image and the target object, the image storing unit 140 stores the first image in which the target object appears as the object image of the target object for each target object according to the first recognition result, wherein, the corresponding object image is identified. For example, in the above case that the pre-stored target object includes the purse, the key, the mobile phone and the first recognition result indicates that key appears in the current first image, the current first image is stored for the key as the object image of the key. And in case that the first recognition result indicates that the key and the mobile phone appears in the current first image, the current first image can be stored for the key and the object image of the mobile phone respectively to be as the object image of the key and the mobile phone respectively. According to one embodiment of the present invention, the object storing unit 110 and the image storing unit 140 can be provided independently in the electronic apparatus 100. Alternatively, the object storing unit 110 and the image storing unit 140 can be provided in different storage regions in one storage module. In order to save the storage space, preferably, the image storing unit can only keep predetermined number of object images stored at last for each target object. For example, the image storing unit can only keep the object image of the target object obtained at the last three times for each target object. Also for example, the image storing unit can only keep the object image of the target object obtained at the last time for each target object. In this case, when one object image has been already kept for the target object and the recognizing unit recognizes that the target object appears in the first image again, the object image of the target object stored previously can be deleted, and the first image in which the target object appears recognized by the recognizing unit again is kept in the storing unit as the object image of the target object.

Also, according to one example of the present invention, when the recognizing unit 130 determines that one or more of the target objects appears in the first image, the recognizing unit 130 can further determine whether each target object in the first image is in predetermined area of the first image, and generates a second recognition result. For example, the predetermined area may be area at the center of the first image. According to the first recognition result and the second recognition, the image storing unit 140 can store the first image in which the target object appears and the target object is in the predetermined area for each target object as the object image of the target object.

Further, according to another example of the present invention, according to the first recognition result, the image storing unit 140 can store the first image in a continuous time period from the time when the target object appears in the first image to the time when the target object does not appear in the first image for each target object as the object image of the target object, wherein, the corresponding object image is identified according to the continuous time period and the target object.

In some instances, the user may use the target object continuously in a long time, so that the target object may appears in the first image continuously in a long time. In this case, in order to save storage space, according to another embodiment of the present invention, according to the first recognition result, the image storing unit 140 can store the first image in a continuous time period passing a first predetermined time since the target object appears in the first image for each target object as one object image of the target object, i.e., a first object image, instead of storing the first image in a continuous time period from the time when the target object appears in the first image to the time when the target object does not appear in the first image as the first object image of the target object, wherein, corresponding first object image is identified according to the continuous time period and the target object. That is, according to the first recognition result, when the time during which the specific target object appears continuously in the first image exceeds a first predetermined time period, the image storing unit 140 only stores the first image in the continue time period passing the first predetermined time period since the target object appears in the first image for each target object as the first object image of the target object, and does not store the first object image in which the target object still appears after the first predetermined time period any longer.

Alternatively, after acquiring the first object image, when the recognizing unit 130 determines that there is one or more of target object of which the first object image is acquired in the first image again after a second predetermined time period, a third recognition result is generated. According to the third recognition result, the image storing unit 140 can further store the first image in the continue time period passing the first predetermined time period since the recognizing unit 130 determines that there is the target object in the first image again for each target object of the one or more of target objects of which the first object image is acquired as another object image of the target object, i.e., a second object image, wherein, corresponding second object image is identified according to the continue time period and the target object. For example, in case that the mobile phone as one target object appears in the first image from 9 am to 2 pm of a day and the first predetermined time period is 5 minutes and the second predetermined time period is 3 hours, the image storing unit 140 stores the first image from the 9 am to 9:05 am as one object image of the mobile phone, i.e., the first object image. And after passing 3 hours, the first image from 12:05 am to 12:10 am is stored as another object image of the mobile phone, i.e., the second object image. Thus, in case that the user uses a specific target object continuously for a long time, not only the storage space is saved, but also the stored object image indicating case of the user using the target object can be upgraded appropriately.

Examples of storing the object image according to time period are described above. According to another example of the present invention, the object image can be stored according to a geographic position where the electronic apparatus 100 is. In particular, the electronic apparatus 100 in FIG. 1 can further include a second acquiring unit. The second acquiring unit can acquire geographic position information of the electronic apparatus. When the geographic position information indicates that the distance of the movement of the electronic apparatus is larger than a predetermined distance, according to the first recognition result, the image storing unit 130 can store the first image in a continue time period from the time when the recognizing unit 130 determines that there is the target object in the first image to the time when the distance of the movement of the electronic apparatus 100 is equal to the predetermined distance as one object image of the target object, i.e., a third object image for each target object, and stores the first image in a continue time period since the distance of the movement of the electronic apparatus 100 is larger than the predetermined distance as another object image of the target object, i.e., a fourth object image. For example, in case that the mobile phone as one target object always appears in the first image when the electronic apparatus 100 moves from a first site A to a second site B with a distance of 50 kilometers to the first site A and the predetermined distance is 6 kilometers, the image storing unit 140 stores the first image in which the mobile phone always appears in a continue time period from when the electronic apparatus 100 is at the first site A to when the electronic apparatus 100 moves 6 kilometers from the first site A as one object image of the mobile phone, i.e., the third object image. And the image storing unit 140 stores the first image in which the mobile phone always appears in a continue time period from when the electronic apparatus 100 moves 6 kilometers from the first site A to the second site B to when the electronic apparatus 100 is at the second site B as another object image of the mobile phone, i.e., the fourth object image. Thus, in case that the user uses a specific target object continuously for a long time, not only the storage space is saved, but also the stored object image indicating case of the user using the target object can be upgraded appropriately.

Back to FIG. 1, the receiving unit 150 can receive an input of the user. When the input of the user is a search input, the first acquiring unit 160 can determine the target object indicated by the search input, and acquire the object image corresponding to the target object indicated by the search input in the storing unit. The display unit 170 can display the object image corresponding to the target object indicated by the search input. According to one example of the present invention, the display unit 170 can only display one object image stored at last corresponding to the target object indicated by the search input so as to facilitate the user to view rapidly.

With the electronic apparatus according to the present embodiment, the pressure of the user's memory can be mitigated, and it helps the user to manage article conveniently. In particular, in the electronic apparatus and the method for storing data according to the embodiment of the present invention, by recognizing whether the target object appears in the picked-up first image and storing the first image in which the target object appears as the object image of the target object when the target object appears in the first image, the user can view the stored object image of the target object when he cannot find the target object, so as to find the target object according to the object image.

Figure 2:
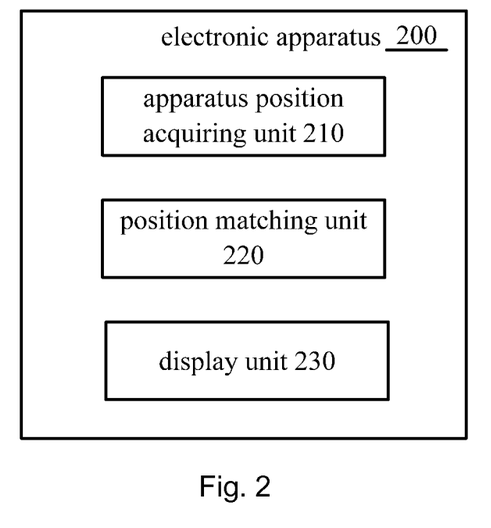
FIG. 2 is a schematic structured block diagram of the electronic apparatus according to another embodiment of the present invention.

Further, the electronic apparatus shown in FIG. 1 can further include a position acquiring unit and a position matching unit. FIG. 2 is a schematic structured block diagram of the electronic apparatus according to another embodiment of the present invention. In the example shown in FIG. 2, the components different from those in the electronic apparatus shown in FIG. 1 are mostly described, and the description of the same component and function as those of the electronic apparatus shown in FIG. 1 is omitted for simplicity.

As shown in FIG. 2, the electronic apparatus 200 of the present embodiment includes an apparatus position acquiring unit 210, a position matching unit 220 and a display unit 230. In particular, the apparatus position acquiring unit 210 can obtain and record travelling line of the electronic apparatus in a first time period, wherein the travelling line includes first position information indicating a first geographic position which the electronic apparatus passes in the first time period and direction of travel when the electronic apparatus passes the first geographic position. For example, in the first time period, in the west zone of Zhongguancun, A building and B building are passed subsequently along the Caihefang Road to the south, and then C building is passed and D building is arrived along the Danling Road to the west. In this case, the travelling line recorded by the apparatus position acquiring unit 210 can include geographic position of the A building and travelling southward when the user passes the geographic position of the A building, geographic position of the B building and travelling southward when the user passes the geographic position of the B building, the road junction of the Caihefang Road and the Danling Road, and travelling southward turning to travelling westward when the user passes the geographic position of the road junction, geographic position of the C building and travelling westward when the user passes the geographic position of the C building, geographic position of the D building and the travelling line of the user ending at D building, and so on.

According to one example of the present invention, whether the travelling line of the area to which the current position belongs is saved previously in the electronic apparatus can be determined according to the current position of the electronic apparatus, and in case that the travelling line of the area to which the current position belongs is not saved, i.e., in case that the user in the area to which the current position of the electronic apparatus belongs for the first time, the apparatus position acquiring unit 210 can obtain and record the travelling line of the electronic apparatus automatically in the first time period. Further, according to another example of the present invention, the apparatus position acquiring unit 210 can obtain and record the travelling line of the electronic apparatus according to a recording instruction from the user, and stop acquiring and recording the travelling line according to a stop recording instruction from the user.

The apparatus position acquiring unit 210 further obtains second position information indicating the current geographic position of the electronic apparatus after the first time period. Then, the position matching unit 220 determines whether there is target position information matching the second position information in the first position information. The target position information can be same as the geographic position indicated by the second position information. That is, the position matching unit 220 can determine whether there is position indicated by the second position information in a pre-recorded travelling line. According to one example of the present invention, the apparatus position acquiring unit 210 can obtain the second position information and the position matching unit 220 can determine whether there is target position information matching the second position information in the first position information when a position matching instruction from the user is received. For example, when the user is at where he is used to, the position matching instruction can be inputted.

When it determines that there is target position information matching the second position information in the first position information, the display unit 230 displays according to the direction of travel when passing the electronic apparatus passes the first geographic position corresponding to the target position information. For example, in case that the apparatus position acquiring unit 210 has recorded the travelling line in west zone of Zhongguancun of the user in the first time period as explained in the above, when the second position information obtained by the apparatus position acquiring unit 210 indicates that the user is at B building of west zone of Zhongguancun again, the position matching unit 220 can determine target position information matching the second position information in the pre-recorded travelling line. Then, the display unit 230 displays according to the direction of travelling southward when the electronic apparatus passes the B building in the first time period.

According to one example of the present invention, the display unit 230 can display an identification indicating the direction of travel when the electronic apparatus passes the first geographic position corresponding to the target position information. Alternatively, according to another example of the present invention, the display unit 230 obtains a direction of return which is opposite to the direction of travel when the electronic apparatus passes the first geographic position corresponding to the target position information, and displays an identification indicating the direction of return, so that when the user arrive at a specific site in the first time period and needs to return from the specific site to a position such as station after the first time period, the user can know the routine of return conveniently. For example, the direction can be indicated by the identification such as arrows.

As compared with a conventional navigation unit for helping user to position at unfamiliar place or find a target position by connecting to network to download map, with the electronic apparatus of the above present embodiment, when the user is at a specific region for the first time, the travelling line including the first position information indicating the first geographic position in the region passed by the user and direction of travel as passing the first geographic position can be recorded, and when the user arrives a certain position of the specific region again, it displays according to the direction of travel of the position at which the user is used to (for example, it displays the direction of travel of the position at which the user is used to or displays an opposite direction of the direction of travel of the position at which the user is used to), so that the user can find destination rapidly according to the displayed direction and save flow amount of data.

Further, according to another example of the present invention, the apparatus position acquiring unit 210 can further obtain and record time when the electronic apparatus passes the first geographic position and/or time period during which the electronic apparatus stays at the first geographic position; and, when it determines that there is target position information matching the second position information in the first position information, the display unit 230 can further display according to the time when the electronic apparatus passes the first geographic position and/or time period during which the electronic apparatus stays at the first geographic position. Thus, more information related to the target position information of the user is prompted to the user, so as to provide individualized service to the user.

As explained in the above, in the embodiment according to the present invention, the electronic apparatus may be the wearable electronic apparatus, so as to facilitate the image pick-up unit picking up the first image while the user wears the electronic apparatus. In this case, there is a fixing unit through which the wearable electronic apparatus can keep a positional relationship with respect to a first part of the body of the user.

Figure 3:
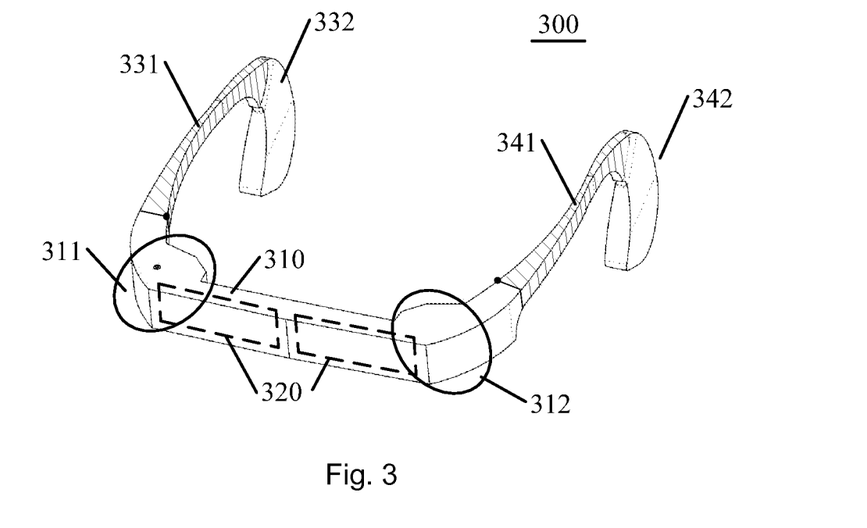
FIG. 3 is an explanatory drawing illustrating an example situation that the electronic apparatus shown in FIGS. 1 and 2 is a head mount electronic apparatus.

For example, the wearable electronic apparatus may be a glass-type electronic apparatus. FIG. 3 is an explanatory drawing illustrating one example situation of the head mount electronic apparatus shown in FIGS. 1 and 2. The wearable electronic apparatus 300 includes glass frame component 310, eyeglass component 320 connected to the glass frame component 310, fixing unit, a object storing unit, an image pick-up unit, a recognizing unit, an image storing unit, a receiving unit, a first acquiring unit and a display unit. The object storing unit, the image pick-up unit, the recognizing unit, the image storing unit, the receiving unit, the first acquiring unit and the display unit are similar to the object storing unit, the image pick-up unit, the recognizing unit, the image storing unit, the receiving unit, the first acquiring unit and the display unit or the like in the electronic apparatus 100 described above in combination with FIG. 1, thus they are no longer described detailed here.

The object storing unit, the image pick-up unit, the recognizing unit, the image storing unit, the receiving unit and the first acquiring unit can be provided in the fixing unit and/or the glass frame component 310. The fixing unit includes a first supporting arm, a second supporting arm, a third holding part. As shown in FIG. 3, the first supporting arm includes a first connection portion 331 (as shown in the shadow part in FIG. 3) and a first holding portion 332. The first connection portion 331 connects the glass frame component 310 and the first holding portion 332. The second supporting arm 340 includes a second connection portion 341 (as shown in the shadow part in FIG. 3) and a second holding portion 342. The second connection portion 341 connects the glass frame component 310 and the second holding portion 342. A third holding portion (not show) is provided on the glass frame component 310. In particular, the third holding portion can be provided at a position between two eyeglass components on the glass frame component 310. The head mount electronic apparatus is held on the head of the user through the first holding portion, the second holding portion and the third holding portion. In particular, the first holding portion and the second holding portion are used for supporting the first supporting arm and the second supporting arm at the ear part of the user, and the third holding portion is for supporting the glass frame component 310 at the bridge of the nose of the user.

The image pick-up unit can be provided on the glass frame component 310. Alternatively, it can be provided on the first supporting arm or the second supporting arm.

Further, the wearable electronic apparatus 300 of the present embodiment can further include a first data transmission line. The first data transmission line can be provided in the fixing unit and the glass frame component. The first data transmission line can transmit the display signal to the display unit. The display unit can display to the user according to the display signal. Further, in this embodiment, though it describes by taking the data transmission line as example, the present invention is not limited thereto, for example, according to another example of the present invention, the display signal can also be transmitted to the display unit in wireless transmission manner.

Figure 4:
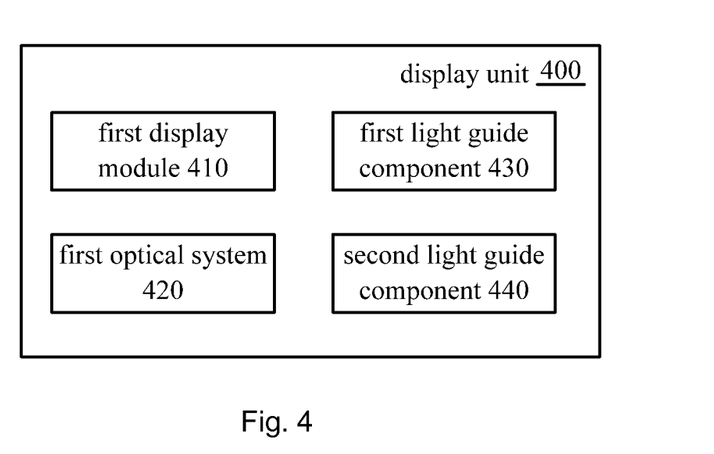
FIG. 4 is a schematic block diagram illustrating display unit according to one example of the present invention.
Figure 5:
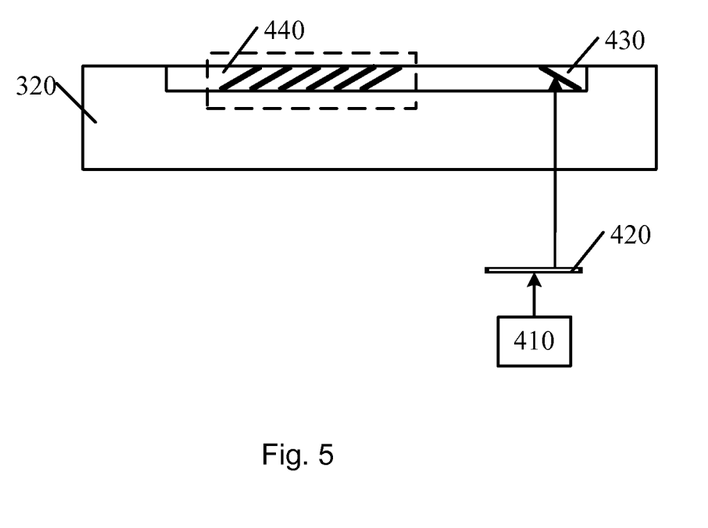
FIG. 5 is an explanatory drawing illustrating one example situation of the display unit shown in FIG. 4.

FIG. 4 is a schematic block diagram illustrating display unit according to one example of the present invention. As shown in FIG. 4, the display unit 400 can include a first display module 410, a first optical system 420, a first light guide component 430 and a second light guide component 440. FIG. 5 is an explanatory drawing illustrating one example situation of the display unit shown in FIG. 4.

The first display module 410 can be provided in the glass frame component 310 and connect to the first data transmission line. The first display module 410 can display the first image according to a first video signal transmitted through the first data transmission line. According to one example of the present invention, the first display module 410 may be display module of mini display screen with smaller size.

The first optical system 420 can also be provided in the glass frame component 310. The first optical system 420 can receive light ray emitted from the first display module and make light path conversion to the light ray emitted from the first display module to form a first magnified virtual image. That is, the first optical system 420 has positive refractive power. So that the user can view the first image clearly, and the size of the image viewed by the user is not restricted by the size of the display unit.

For example, the optical system can include a convex lens. Alternatively, in order to reduce aberration and avoid interference to the imaging by chromatic dispersion or the like and bring the user better visual experience, the optical system can form lens component by a plurality of lens including convex lens and concave lens. Further, according to one example of the present invention, the first display module 410 and the first optical system 420 can be arranged correspondingly along the optical axis of the optical system. Alternatively, according to another example of the present invention, the display unit can further include a fifth light guide component to transmit the light ray emitted from the first display module 410 to the first optical system 420.

As shown in FIG. 5, after the first optical system 420 receives the light ray emitted from the first display module 410 and make light path conversion to the light ray emitted from the first display module 410, the first light guide component 430 can transmit the light ray passing the first optical system to the second light guide component 440. The second light guide component 440 can be provided in the eyeglass component 320. And the second light guide component 440 can receive the light ray transmitted through the first light guide component 430 and reflect the light ray transmitted through the first light guide component 430 to eyes of the user wearing the head mount electronic apparatus.

Back to FIG. 3, alternatively, the eyeglass component 320 satisfies a first predetermined light transmittance in a direction from inside to outside, so that the user can view the surrounding environment at the same time of viewing the first magnified virtual image. On the other hand, the eyeglass satisfies a second predetermined light transmittance in a direction from outside to inside. So that a part of light can be refracted or reflected when the light in the surrounding environment is relatively strong.

Further, as shown in FIG. 3, according to one example of the present invention, the glass frame component 310 can include a first pile-head portion 311 connected to the first supporting arm and a second pile-head portion 312 connected to the second supporting arm (as portion of the glass frame component shown in circle of FIG. 3). The first display module and the first optical system in the display unit are provided in the pile-head portion of the glass frame component 310.

Figure 6:
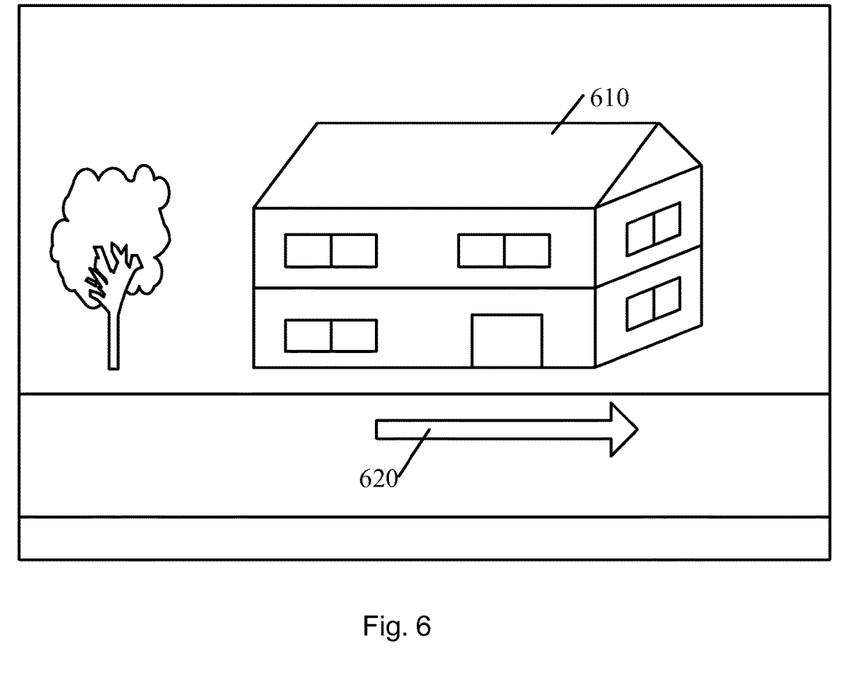
FIG. 6 is an explanatory drawing of one example situation of the content seen by the user in case that the display unit of the electronic apparatus displays according to the direction of travelling when the electronic apparatus pass a first geographic position corresponding to target position information.

FIG. 6 is an explanatory drawing of one example situation of the content seen by the user in case that the display unit displays according to direction of travelling when the electronic apparatus passes a first geographic position corresponding to target position information and when the electronic apparatus 200 is the wearable electronic apparatus shown in FIG. 3. As shown in FIG. 6, the user can see a scenery 610 at the first geographic position through the eyeglass component, and can also see direction identification 620 overlapped on the scenery 610 displayed by the display unit. So that the user can know the direction in which he should travel without downloading map and without recognizing apparatus such as compass or the like.

Figure 7:
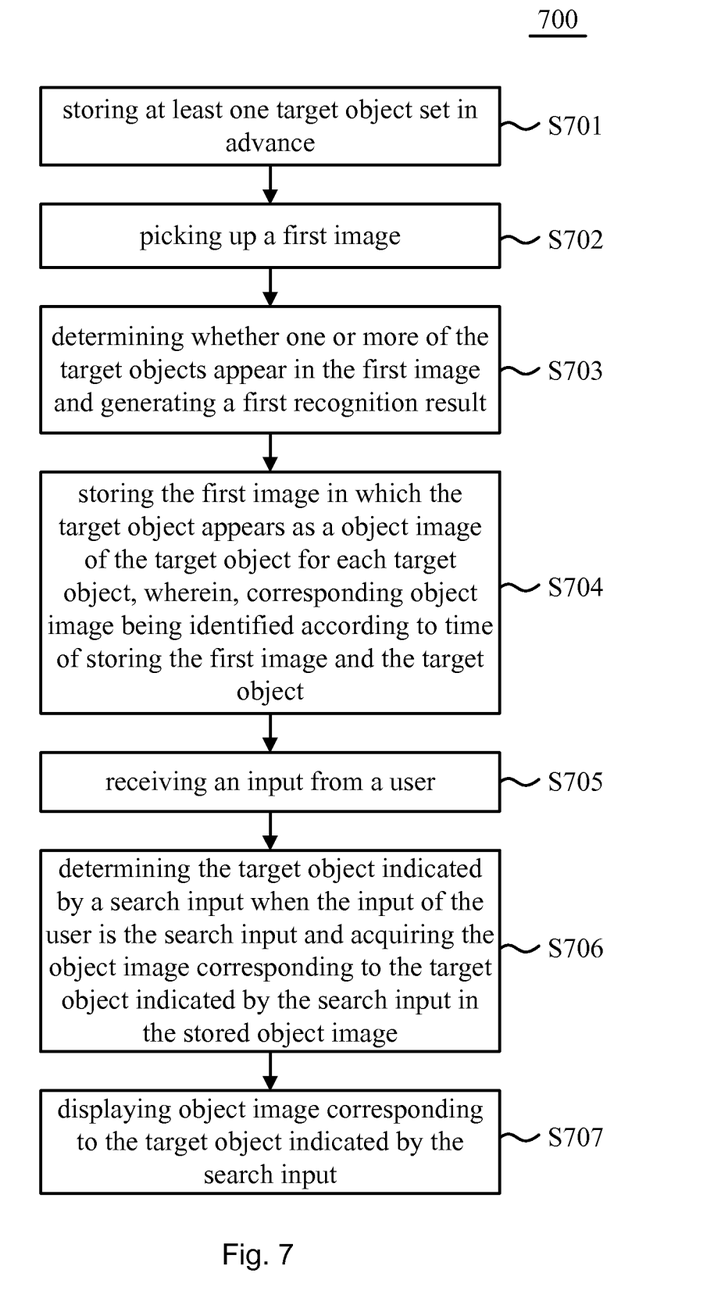
FIG. 7 is a flow chart describing the method for storing data according to one embodiment of the present invention.

Hereinafter, the method for storing data of the embodiment of the invention is explained with reference to FIG. 7. FIG. 7 is a flow chart describing the method for storing data 700 according to the embodiment of the present invention. The method for storing data 700 can be used to the electronic apparatus. In the embodiment according to the present invention, the electronic apparatus may be the wearable electronic apparatus such as eyeglass type electronic apparatus. The respective steps in the method for storing data 700 can be executed by the above-described corresponding modules in the electronic apparatus shown in FIG. 1, and thus there will no longer described specifically for simplicity.

For example, in step S701, at least one target object set in advance are stored. According to one example of the present invention, the target object may be common portable article of the user, for example, a purse, a key, a mobile phone, a multimedia player, a portable notebook computer, a tablet computer or the like.

In step S702, the first image is picked-up. For example, the electronic apparatus can include the image pick-up unit such as camera. And in step S702, the environment around the electronic apparatus can be shot automatically by the image pick-up unit to obtain the first image.

In step S703, whether one or more of pre-stored target object appears in the first image is determined, and the first recognition result is generated. For example, when the pre-stored target object includes the purse, the key, the mobile phone, and in step 703, it determines that the key appears in the first image, the first recognition result is generated to indicate that the key appears in the current first image.

Then, in step S704, according to the first recognition result, the first image in which the target object appears is stored as the object image of the target object for each target object, wherein, the corresponding object image is identified according to time of storing the first image and the target object. For example, in the above case that the pre-stored target object includes the purse, the key, the mobile phone and the first recognition result indicates that key appears in the current first image, in step S704, the current first image is stored for the key as the object image of the key. And in case that the first recognition result indicates that the key and the mobile phone appears in the current first image, in step S704, the current first image can be stored for the key and the mobile phone respectively to be as the object image of the key and the object image of the mobile phone respectively. In order to save storage space, preferably, the image storing unit can only keep predetermined number of object images stored at last for each target object. For example, only the object image of the target object obtained for the last three times are kept for each target object. Also, for example, only the object image of the target object obtained for the last time is kept for each target object. In this case, when one object image has been already kept for the target object and that the target object appears in the first image is further recognized in step S703, in step S704, the object image of the target object stored previously can be deleted, and the first image in which the target object appears recognized by the recognizing unit again is kept as the object image of the target object.

Also, according to one example of the present invention, when it determines that one or more of the target objects appear in the first image in step S703, the method shown in FIG. 7 can further include determining whether each target object in the first image is in predetermined area of the first image and generating a second recognition result. For example, the predetermined area may be area at the center of the first image. In step S704, the first image in which the target object appears and the target object is in the predetermined area can be stored as the object image of the target object for each target object according to the first recognition result and the second recognition result.

Further, according to another example of the present invention, in step S704, according to the first recognition result, the first image in a continue time period from when the target object appears in the first image to when the target object does not appear in the first image can be stored as the object image of the target object for each target object, wherein, the corresponding object image is identified according to the continue time period and the target object.

In some instances, the user may use the target object continuously in a long time, so that the target object may appears in the first image continuously in a long time. In this case, in order to save storage space, according to another embodiment of the present invention, in step S704, according to the first recognition result, the first image in a continue time period passing a first predetermined time period since the target object appears in the first image can be stored as one object image of the target object, i.e., the first object image for each target object, instead of storing the first image in a continue time period from the time when the target object appears in the first image to the time when the target object does not appear in the first image as the first object image of the target object, wherein, the corresponding first object image is identified according to the continue time period and the target object. That is, according to the first recognition result, when the time during which the specific target object appears continuously in the first image exceeds a first predetermined time period, in step S704, only the first image in the continue time period passing the first predetermined time period since the target object appears in the first image is stored as the first object image of the target object for each target object, and the first object image in which the target object still appears after the first predetermined time period are no longer stored.

Alternatively, after acquiring the first object image, the method in FIG. 7 can further include generating a third recognition result when it determines that there is one or more of target objects of which the first object image is acquired in the first image once again after passing a second predetermined time period; and according to the third recognition result, storing the first image in a continue time period passing the first predetermined time period since it determines that there is the target object in the first image once again as another object image of the target object, i.e., the second object image for each target object in the one or more of target objects of which the first object image is acquired, wherein corresponding second object images are identified according to the continue time period and the target object. For example, in case that the mobile phone as one target object appears in the first image from 9 am to 2 pm of a day and the first predetermined time period is 5 minutes and the second predetermined time period is 3 hours, in step S704, the first image from the 9 am to 9:05 am as one object image of the mobile phone, i.e., the first object image is stored. And after passing 3 hours, the first image from 12:05 am to 12:10 am is stored as another object image of the mobile phone, i.e., the second object image. Thus, in case that the user uses a specific target object continuously for a long time, not only the storage space is saved, but also the stored object image indicating case of the user using the target object can be upgraded appropriately.

Example of storing the object image according to time period is described above. According to another example of the present invention, the object image can be stored according to a geographic position in the method 700. In particular, in step S704, geographic position information of the electronic apparatus can be acquired. When the geographic position information indicates that the distance of the movement of the electronic apparatus is larger than a predetermined distance, in step S704, according to the first recognition result, the first image in a continue time period from the time of determining that there is the target object in the first image to when the distance of the movement of the electronic apparatus is equal to the predetermined distance can be stored as one object image of the target object, i.e., a third object image for each target object, and the first image in a continue time period since the distance of the movement of the electronic apparatus 100 is larger than the predetermined distance can be stored as another object image of the target object, i.e., a fourth object image. For example, in case that the mobile phone as one target object always appears in the first image when the electronic apparatus 100 moves from a first site A to a second site B with a distance of 50 kilometers to the first site A and the predetermined distance is 6 kilometers, in step S704, the first image in which the mobile phone always appears in a continue time period from when the electronic apparatus 100 is at the first site A to when the electronic apparatus 100 moves 6 kilometers from the first site A is stored as one object image of the mobile phone, i.e., the third object image. And the first image in which the mobile phone always appears in a continue time period from when the electronic apparatus 100 moves 6 kilometers from the first site A to the second site B to when the electronic apparatus 100 is at the second site B is stored as another object image of the mobile phone, i.e., the fourth object image. Thus, in case that the user uses a specific target object continuously for a long time, not only the storage space is saved, but also the stored object image indicating case of the user using the target object can be upgraded appropriately.

Back to FIG. 7, in step S705, an input of the user can be received. When the input of the user is a search input, in step S706, the target object indicated by the search input is determined, and the object image corresponding to the target object indicated by the search input is acquired in the storing unit. And then in step S707, the object image corresponding to the target object indicated by the search input is displayed. According to one example of the present invention, in step S707, only one object image stored at last corresponding to the target object indicated by the search input is displayed so as to facilitate the user to view rapidly.

With method for storing data according to the present embodiment, the pressure of the user's memory can be mitigated, and it helps the user to manage article conveniently. In particular, in method for storing data according to the embodiment of the present invention, by recognizing whether the target object appears in the picked-up first image and storing the first image in which the target object appears as the object image of the target object when the target object appears in the first image, the user can view the stored object image of the target object when he cannot find the target object, so as to find the target object according to the object image.

Figure 8:
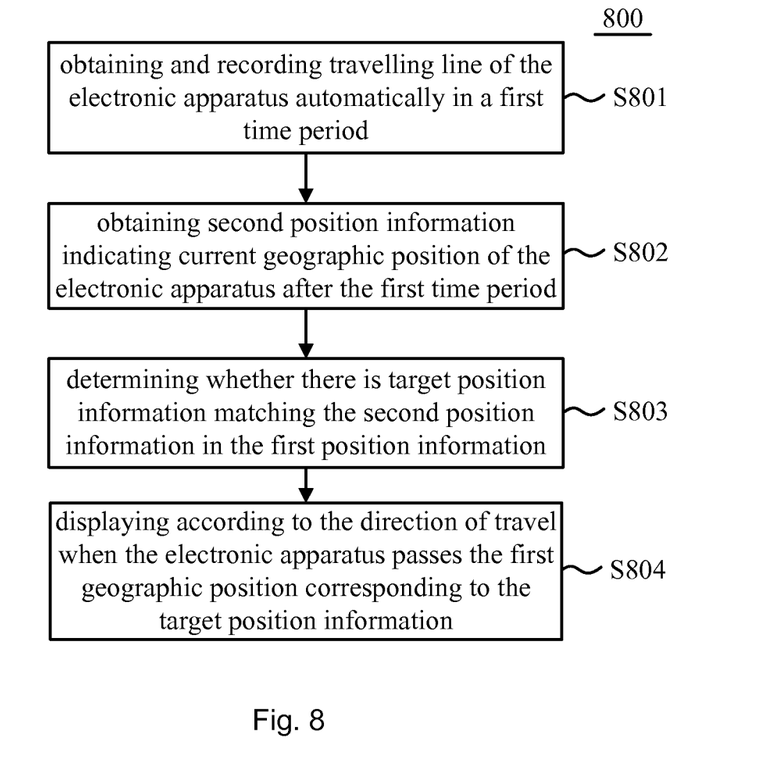
FIG. 8 is a flow chart describing the method for storing data according to another embodiment of the present invention.

FIG. 8 is a flow chart describing the method for storing data 800 according to another embodiment of the present invention. The respective steps in the method for storing data 800 can be executed by the above-described corresponding modules in the electronic apparatus shown in FIG. 2, and thus there will no longer described specifically for simplicity.

As shown in FIG. 8, in step S801, the travelling line of the electronic apparatus is obtained and recorded in the first time period, wherein the travelling line includes first position information indicating the first geographic position that the electronic apparatus passes in the first time period and the direction of travel when the electronic apparatus passes the first geographic position. For example, in the first time period, in the west zone of Zhongguancun, A building and B building are passed subsequently along the Caihefang Road to the south, and then C building is passed and D building is arrived along the Danling Road to the west. In this case, the travelling line recorded according to step S801 can include geographic position of the A building and travelling southward when the user passes the geographic position of the A building, geographic position of the B building and travelling southward when the user passes the geographic position of the B building, the road junction of the Caihefang Road and the Danling Road, and travelling southward turning to travelling westward when the user passes the geographic position of the road junction, geographic position of the C building and travelling westward when the user passes the geographic position of the C building, geographic position of the D building and the travelling line of the user ending at D building, and so on.

According to one example of the present invention, whether the travelling line of the area to which the current position belongs is saved previously in the electronic apparatus can be determined according to the current position of the electronic apparatus, and in case that the travelling line of the area to which the current position belongs is not saved, i.e., in case that the user in the area to which the current position of the electronic apparatus belongs for the first time, the travelling line of the electronic apparatus can be obtained and recorded automatically in the first time period in step s801. Further, according to another example of the present invention, in step S801, the travelling line of the electronic apparatus can be obtained and recorded according to a recording instruction from the user, and acquiring and recording the travelling line is stopped according to a stop recording instruction from the user.

In step S802, second position information indicating the current geographic position of the electronic apparatus is obtained after the first time period. Then, in step S803, whether there is target position information matching the second position information is determined in the first position information. The target position information can be same as the geographic position indicated by the second position information. That is, in step S803, whether there is position indicated by the second position information is determined in a pre-recorded travelling line. According to one example of the present invention, the second position information can be obtained according to step S802 and whether there is target position information matching the second position information can be determined in the first position information according to step S803 when a position matching instruction from the user is received. For example, when the user is at where he is used to, the position matching instruction can be inputted.

When it determines that there is target position information matching the second position information in the first position information, in step S804, it displays according to the direction of travel when passing the electronic apparatus passes the first geographic position corresponding to the target position information. For example, in case that the travelling line in west zone of Zhongguancun of the user in the first time period has been recorded according to step S801 as explained in the above, when the second position information obtained according to step S802 indicates that the user is at B building of west zone of Zhongguancun again, the target position information matching the second position information in the pre-recorded travelling line can be determined according to step S803. Then, according to step s804, it displays according to the direction of travelling southward when the electronic apparatus passes the B building in the first time period.

According to one example of the present invention, in step S804, identification indicating the direction of travel when the electronic apparatus passes the first geographic position corresponding to the target position information can be displayed. Alternatively, according to another example of the present invention, in step S804, direction of return which is opposite to the direction of travel when the electronic apparatus passes the first geographic position corresponding to the target position information is obtained, and an identification indicating the direction of return is displayed, so that when the user arrive at a specific site in the first time period and needs to return from the specific site to a position such as station after the first time period, the user can know the routine of return conveniently. For example, the direction can be indicated by the identification such as arrows.

With the method for storing data direction of the above present embodiment, when the user is at a specific region for the first time, the travelling line including the first position information indicating the first geographic position in the region passed by the user and direction of travel as passing the first geographic position can be recorded, and when the user arrives a certain position of the specific region again, it displays according to the direction of travel of the position at which the user is used to (for example, it displays the direction of travel of the position at which the user is used to or displays an opposite direction of the direction of travel of the position at which the user is used to), so that the user can find destination rapidly according to the displayed direction and save flow amount of data.

Further, according to another example of the present invention, the method shown in FIG. 8 can further include obtaining and recording the time when the electronic apparatus passes the first geographic position and/or the time period during which the electronic apparatus stays at the first geographic position at the same time of executing step S801; and, when it determines that there is target position information matching the second position information in the first position information, it displays according to the time when the electronic apparatus passes the first geographic position and/or the time period during which the electronic apparatus stays at the first geographic position. Thus, more information related to the target position information of the user is prompted to the user, so as to provide individualized service to the user.

Those skilled in the art can understand the units, modules and steps of respective examples described in combination with the embodiments disclosed in the specification can be implemented by electronic hardware, computer software or the combination of both, in order to explain the interchange ability of the hardware and the software, the constitution and steps of the respective examples are described generally according to the function in the above description. Whether the functions are executed by hardware or software is depending to the specific applications and design constraint of the technical solution. Those skilled in the art can implement the described function by using different methods for each specific application, and such implementations are not regarded as beyond the scope of the invention.

Those skilled in the art can understand that the invention can be made various modifications, combinations, partial combinations and alternation depending on the design need and other factors, so long as they are in the range of the attached claims and the equivalent ones.

The invention claimed is:

1. An electronic apparatus comprising:
an object storing unit configured to store at least one target object set in advance;
an image pick-up unit configured to shoot the environment around the electronic apparatus to be as a first image;
a recognizing unit configured to determine whether one or more of the target objects appear in the environment of the first image, and generate a first recognition result;
an image storing unit configured to according to the first recognition result, store the first image in which the target object appears as an object image of the target object for each target object, wherein, a corresponding object image is identified according to a time of storing the first image and the target object;
a receiving unit configured to receive an input from a user;
a first acquiring unit configured to determine the target object indicated by a search input when the input of the user is the search input, and acquire the object image corresponding to the target object indicated by the search input in the storing unit; and
a display unit configured to display the object image corresponding to the target object indicated by the search input,
wherein according to the first recognition result, the image storing unit stores the first image in a continuous time period passing a first predetermined time period since the target object appears in the first image as a first object image of the target object for each target object, wherein, the corresponding first object image is identified according to the continuous time period and the target object.

2. The electronic apparatus according to claim 1, wherein when the recognizing unit determines that one or more of the target objects appear in the first image, the recognizing unit is further configured to determine whether each target object in the first image is in a predetermined area of the first image, and generate a second recognition result, and
according to the first recognition result and the second recognition result, the image storing unit stores the first image in which the target object appears and the target object is in the predetermined area as the object image of the target object for each target object.

3. The electronic apparatus according to claim 1, wherein the image storing unit keeps a predetermined number of the object images stored at last for each target object.

4. The electronic apparatus according to claim 1, wherein according to the first recognition result, the image storing unit stores the first image in a continue time period from the time when the target object appears in the first image to the time when the target object does not appear in the first image as the object image of the target object for each target object, wherein, the corresponding object image is identified according to the continue time period and the target object.

5. The electronic apparatus according to claim 1, wherein
after acquiring the first object image, when the recognizing unit determines that there is one or more of target objects of which the first object image is acquired in the first image again after passing a second predetermined time period, a third recognition result is generated, and
the image storing unit is further configured to according to the third recognition result, store the first image in a continue time period passing the first predetermined time period since the recognizing unit determines that there is the target object in the first image once again as another object image of the target object for each target object of the one or more of target objects of which the first object image is acquired, wherein, a corresponding second object image is identified according to the continue time period and the target object.

6. The electronic apparatus according to claim 1, further comprises:
a second acquiring unit configured to acquire geographic position information of the electronic apparatus, and
when the geographic position information indicates that distance of movement of the electronic apparatus is larger than a predetermined distance, the image storing unit according to the first recognition result, stores the first image in a continue time period from the time when the recognizing unit determines that there is the target object in the first image to when the distance of the movement of the electronic apparatus is equal to the predetermined distance as a third object image of the target object for each target object, and stores the first image in a continue time period since the distance of the movement of the electronic apparatus is larger than the predetermined distance as the fourth object image of the target object.

7. The electronic apparatus according to claim 1, wherein the electronic apparatus is a wearable electronic apparatus and further comprises a fixing unit through which the wearable electronic apparatus can keep a positional relationship with respect to a first part of the body of the user.

8. The electronic apparatus according to claim 7, wherein the wearable electronic apparatus is an eyeglass type electronic apparatus, the wearable electronic apparatus further comprises:
a frame component;
an eyeglass component provided in the frame component;
the fixing unit includes:
a first supporting arm including a first connection portion and a first holding portion, wherein the first connection portion is configured to connect the glass frame component and the first holding portion; and
a second supporting arm including a second connection portion and a second holding portion, wherein the second connection portion is configured to connect the glass frame component and the second holding portion, wherein, the frame component includes a third holding portion, and the first holding portion, the second holding portion and the third holding portion are configured to hold the wearable electronic apparatus on head of the user.

9. The electronic apparatus according to claim 1, further comprises:

a position acquiring unit configured to obtain and record travelling line of the electronic apparatus in a first time period and obtain a second position information indicating the current geographic position of the electronic apparatus after the first time period, wherein the travelling line includes first position information indicating the first geographic position that the electronic apparatus passed in the first time period and direction of travel when the electronic apparatus passed the first geographic position; and a position matching unit configured to determine whether there is target position information matching the second position information in the first position information, wherein the display unit is further configured to display according to the direction of travel when the electronic apparatus passed the first geographic position corresponding to the target position information, when it determines that there is the target position information matching the second position information in the first position information.

10. The electronic apparatus according to claim 9, wherein the display unit displays an identification indicating the direction of travel when the electronic apparatus passes the first geographic position corresponding to the target position information.

11. The electronic apparatus according to claim 9, further comprises:

a reversing unit configured to obtain a return direction opposite to the direction of travel when the electronic apparatus passed the first geographic position corresponding to the target position information, and the display unit displays an identification indicating the return direction.

12. The electronic apparatus according to claim 9, wherein the position acquiring unit is further configured to obtain and record time when the electronic apparatus passes the first geographic position and/or time period during which the electronic apparatus stays at the first geographic position; and when it determines that there is the target position information matching the second position information in the first position information, the display unit is further configured to display according to the time when the electronic apparatus passed the first geographic position corresponding to the target position information and/or the time period during which the electronic apparatus stayed at the first geographic position.

13. A method for storing data applied in an electronic apparatus, the method comprises:

storing at least one target object set in advance;

picking up the environment around the electronic apparatus to be as a first image;

determining whether one or more of the target objects appear in the environment of the first image, and generating a first recognition result;

according to the first recognition result, storing the first image in which the target object appears as an object image of the target object for each target object, wherein, a corresponding object image is identified according to time of storing the first image and the target object;

receiving an input from a user;

determining the target object indicated by a search input when the input of the user is the search input, and acquiring the object image corresponding to the target object indicated by the search input in the stored object image; and displaying object image corresponding to the target object indicated by the search input, wherein according to the first recognition result, storing the first image in which the target object appears as the object image of the target object for each target object comprises according to the first recognition result, storing the first image in a continuous time period passing a first predetermined time period since the target object appears in the first image as a first object image of the target object for each target object, wherein, the corresponding first object image is identified according to the continuous time period and the target object.

14. The method for storing data according to claim 13, further comprises:

determining whether each target object in the first image is in a predetermined area of the first image when it determines that one or more of the target objects appear in the first image, and generating a second recognition result, wherein according to the first recognition result, storing the first image in which the target object appears as the object image of the target object for each target object comprises:

according to the first recognition result and the second recognition result, storing the first image in which the target object appears and the target object is in the predetermined area as the object image of the target object for each target object.

15. The method for storing data according to claim 13, wherein according to the first recognition result, storing the first image in which the target object appears as the object image of the target object for each target object comprises:

according to the first recognition result, storing the first image in a continue time period from the time when the target object appears in the first image to the time when the target object does not appear in the first image as the object image of the target object for each target object, wherein, the corresponding object image is identified according to the continue time period and the target object.

16. The method for storing data according to claim 13, wherein according to the first recognition result, storing the first image in which the target object appears as the object image of the target object for each target object comprises:

acquiring geographic position information of the electronic apparatus, and when the geographic position information indicates that distance of movement of the electronic apparatus is larger than a predetermined distance, according to the first recognition result, storing the first image in a continue time period from the time when it determines that there is the target object in the first image to the time when the distance of the movement of the electronic apparatus is equal to the predetermined distance as a third object image of the target object for each target object, and storing the first image in a continue time period since the distance of the movement of the electronic apparatus is larger than the predetermined distance as a fourth object image of the target object.

17. The method for storing data according to claim 13, further comprises:
  obtaining and recording travelling line of the electronic apparatus in a first time period, wherein the travelling line includes first position information indicating a first geographic position which the electronic apparatus passed in the first time period and direction of travel when the electronic apparatus passed the first geographic position;
  obtaining second position information indicating current geographic position of the electronic apparatus after the first time period;
  determining whether there is target position information matching the second position information in the first position information; and
  displaying according to the direction of travelling when the electronic apparatus passed the first geographic position corresponding to the target position information when it determines that there is the target position information matching the second position information in the first position information.

18. The method for storing data according to claim 17, wherein displaying according to the direction of travel when the electronic apparatus passes the first geographic position corresponding to the target position information comprises displaying an identification indicating the direction of travel when the electronic apparatus passes the first geographic position corresponding to the target position information.

19. The method for storing data according to claim 17, wherein displaying according to the direction of travel when the electronic apparatus passes the first geographic position corresponding to the target position information comprises:
  obtaining a return direction opposite to the direction of travel when the electronic apparatus passed the first geographic position corresponding to the target position information; and
  displaying an identification indicating the return direction.

* * * * *